U S007014212B2

United States Patent
Mallis

(10) Patent No.: US 7,014,212 B2
(45) Date of Patent: Mar. 21, 2006

(54) TUBULAR JOINT WEAR INDICATOR

(75) Inventor: David Mallis, The Woodlands, TX (US)

(73) Assignee: Hydril Company LP, Houston, TX (US)

( * ) Notice: Subject to any disclaimer, the term of this patent is extended or adjusted under 35 U.S.C. 154(b) by 182 days.

(21) Appl. No.: 09/843,560

(22) Filed: Apr. 26, 2001

(65) Prior Publication Data

US 2001/0015555 A1 Aug. 23, 2001

Related U.S. Application Data

(62) Division of application No. 09/253,121, filed on Feb. 19, 1999, now abandoned.

(60) Provisional application No. 60/094,627, filed on Jul. 30, 1998.

(51) Int. Cl.
*F16L 55/00* (2006.01)
*B23Q 17/00* (2006.01)

(52) U.S. Cl. .................. 285/93; 285/333; 285/334; 29/407.01; 29/456

(58) Field of Classification Search ............... 285/93, 285/333, 334; 29/407.01, 456; 411/8, 9, 411/10; 73/761
See application file for complete search history.

(56) References Cited

U.S. PATENT DOCUMENTS

| 2,258,066 | A |   | 10/1941 | Oyen ........................ 285/146 |
| 4,192,533 | A | * | 3/1980  | Blose ........................ 285/334 |
| 4,317,585 | A | * | 3/1982  | Boice ......................... 285/93  |
| 4,438,953 | A | * | 3/1984  | Timme, Jr. .................. 285/93   |
| 4,614,120 | A | * | 9/1986  | Fradin et al. ................ 73/761   |
| 4,700,576 | A | * | 10/1987 | Grare et al.                          |
| 4,962,579 | A | * | 10/1990 | Moyer et al. ............. 285/93 X   |
| 6,009,611 | A | * | 1/2000  | Adams et al. ........... 29/407.01   |

FOREIGN PATENT DOCUMENTS

JP           6-129572      *  5/1994  ................ 285/93

* cited by examiner

*Primary Examiner*—A. Dexter Tugbang
(74) *Attorney, Agent, or Firm*—Osha Liang LLP

(57) ABSTRACT

A threaded pipe connection includes a box member, a pin member and a wear indicator for the connection. The pin member has internal threads and the box member has external threads. The internal threads of the box member each increase in width in one direction, while the external threads of the pin member increase in width in the other direction so that the complementary internal and external threads move into engagement upon make-up of the connection.

23 Claims, 5 Drawing Sheets

TUBULAR JOINT WEAR INDICATOR

CROSS-REFERENCE TO RELATED APPLICATIONS

This application is a divisional of U.S. patent application Ser. No. 09/253,121 entitled "Tubular Joint Wear Indicator", filed Feb. 19, 1999 now abandoned, which claims benefit of U.S. Provisional Application No. 60/094,627, entitled "Tubular Joint Wear Indicator," filed Jul. 30, 1998.

BACKGROUND OF INVENTION

1. Field of the Invention

The invention relates to threaded tubular joints usable in oil and gas well drilling and production, such as tubing, casing, line pipe, and drill pipe, commonly known collectively as oilfield tubular goods. More particularly, the invention relates to a wear indicator for a tubular joint for connecting male (pin) and female (box) members.

2. Background Art

The use of threaded tubular connections for joining flow conduits in an end-to-end relationship to form a continuous flow path for transporting fluid under pressure is well known. Oilfield tubular goods all use threaded connections for connecting adjacent sections of conduit or pipe. Examples of such threaded end connections designed for use on oilfield tubular goods are disclosed in U.S. Pat. Nos. 2,239,942; 2,992,019; 3,359,013; RE 30,647; and RE 34,467, all of which are assigned to the assignee of the present invention.

FIGS. 1–2 illustrate a cross section of a wedge thread connection upon make-up of the pin member and the box member. As shown in FIG. 1, when pin member 10 engages box member 12 for the first time there exists no contact between external shoulder 14 of pin member 10 and external shoulder 16 of box member 12. In contrast, as shown in FIG. 2, when the connection is fully worn out, contact between external shoulder 14 of pin member 10 and external shoulder 16 of box member 12 exists upon make-up.

All existing connections used for the drilling of oil or gas wells are subject to torque shoulder wear from usage. In connections where the torque shoulder is a wedge thread form, such as the Hydril Tool Joint connection which is uniquely designed to absorb high torque while also forming a pressure seal, the connection is fully functional up to the point that the external shoulder of the pin member contacts the external shoulder of the box member. When this contact occurs the connection is worn out and needs to be re-cut. There is a need to be able to determine where any given pin or box connection is within its wear cycle prior to the connection being assembled in the field.

One method to determine the wear of the connection is using a function gage that is applied to the pin or box connection hand tight and recording standoff as an indicator or wear. This technique provides limited information in that the amount of damage and/or distortion to the wedge thread form on a used connection could cause the gage to stand off inconsistently when applied hand tight as compared to a power tight make-up position of the worn connection.

SUMMARY OF INVENTION

In general, in one aspect, a thread pipe connection has a pin member having external threads increasing in width in one direction, a box member having internal threads increasing in the other direction so that complementary internal and external threads move into engagement upon make-up of the connection, and within the connection a wear indicator. In accordance with one or more embodiments of the invention, the wear indicator may be disposed on the pin member. The wear indicator may be disposed on the box member. The pin member may have an external shoulder and the wear indicator may be disposed on the external shoulder of the pin member. The box member may have an external shoulder and the wear indicator may be disposed on the external shoulder of the box member. The pin member may have an internal shoulder and the wear indicator may be disposed on the internal shoulder of the pin member. The box member may have an internal shoulder and the wear indicator may be disposed on the internal shoulder of the box member. The pin member may have an external shoulder, the box member may have an external shoulder and the wear indicator may be disposed on at least one of the external shoulders of the pin and box members. The pin member may have an internal shoulder, the box member may have an internal shoulder and the wear indicator may be disposed on at least one of the internal shoulders of the pin and box members.

In general, in one aspect, a method of indicating connection wear includes providing a pin member having external threads increasing in width in one direction, providing a box member having internal threads increasing in the other direction so that complementary internal and external threads move into engagement upon make-up of the connection. The method also includes providing a connection wear indicator and rotationally engaging the pin member and the box member.

In accordance with one or more embodiments of the invention, the method may include disposing the wear indicator on the pin member. The method may include disposing the wear indicator on the box member. The pin member may have an external shoulder and the method may include disposing the wear indicator on the external shoulder of the pin member. The box member may have an external shoulder and the method may include disposing the wear indicator on the external shoulder of the box member. The pin member may have an internal shoulder and the method may include disposing the wear indicator on the internal shoulder of the pin member. The box member may have an internal shoulder and the method may include disposing the wear indicator on the internal shoulder of the box member. The pin member may have an external shoulder and box member have an external shoulder and the method may include disposing the wear indicator on at least one of the external shoulders of the pin and box members.

The pin member may have an internal shoulder and box member have an internal shoulder and the method may include disposing the wear indicator on at least one of the internal shoulders of the pin and box members In general, in one aspect, a thread pipe connection has a pin member having external threads increasing in width in one direction, a box member having internal threads increasing in the other direction so that complementary internal and external threads move into engagement upon make-up of the connection and means of indicating connection wear.

DETAILED DESCRIPTION

Figure 3:
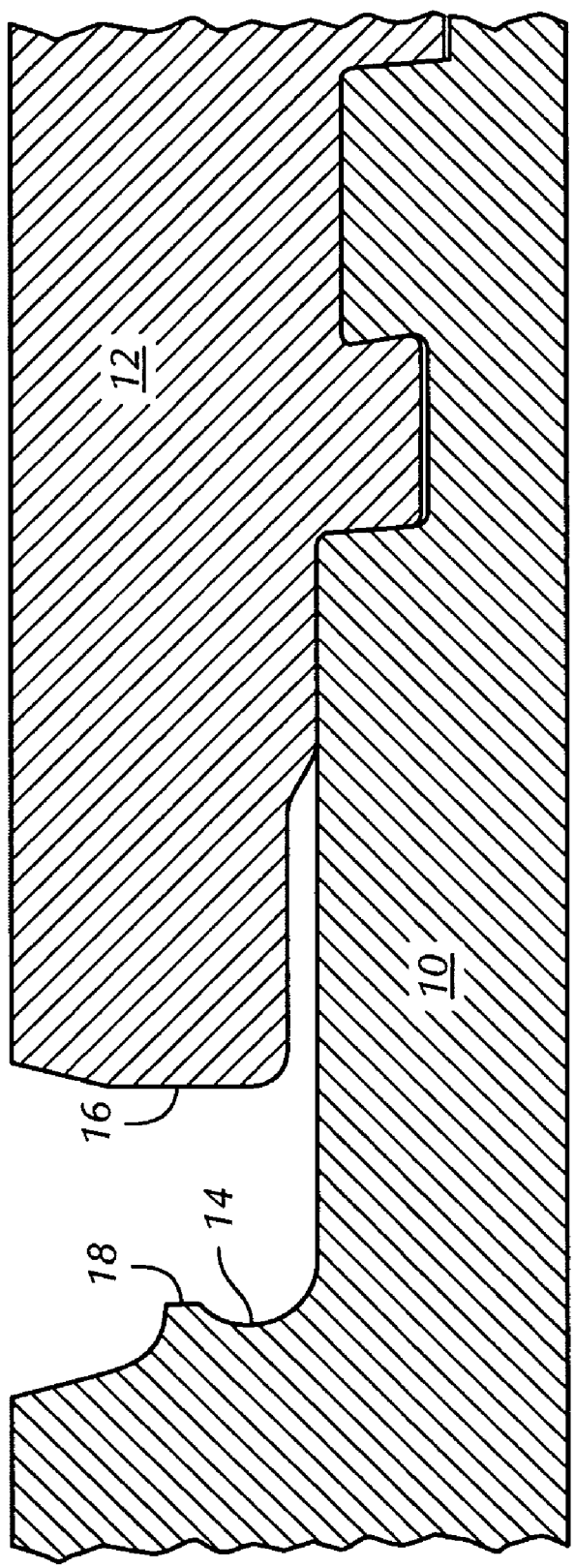
FIG. 3 is a side view of a connector in accordance with an embodiment of the invention made up for the first time.
Figure 4:
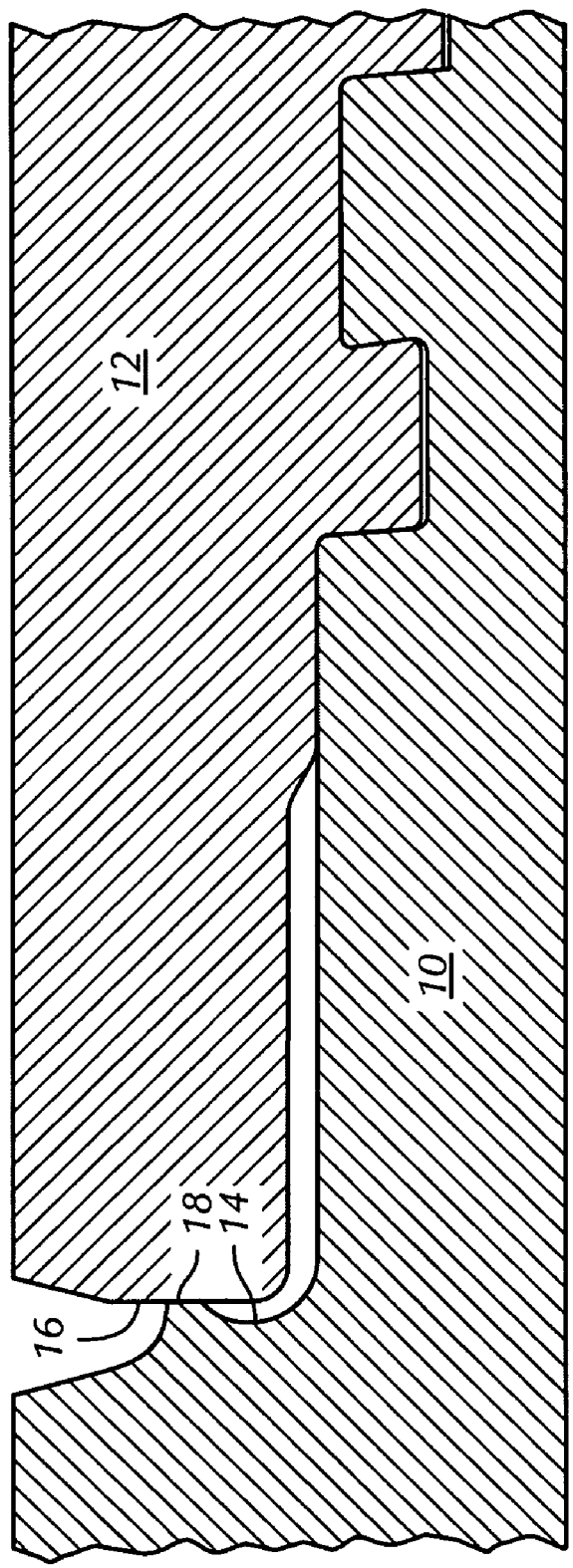
FIG. 4 is a side view of a connector in accordance with an embodiment of the invention with the wear indicator in contact with the mating member just prior to the connector being fully worn out.
Figure 5:
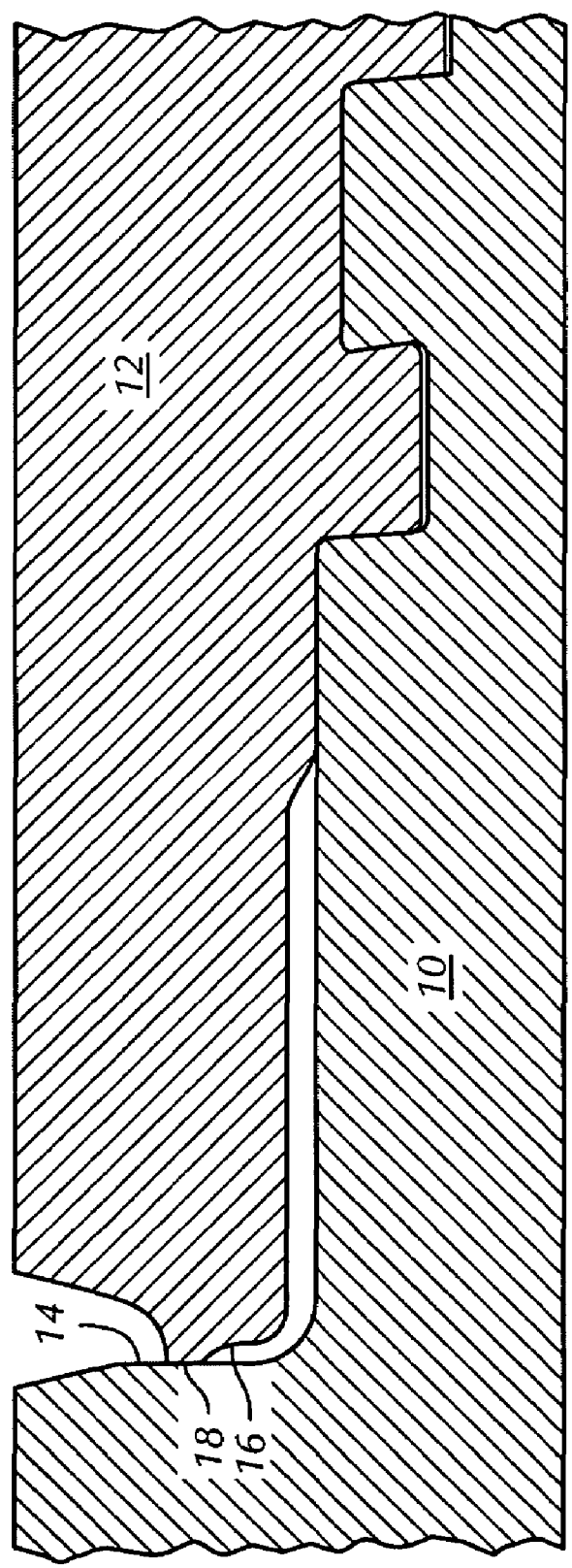
FIG. 5 is a side view of a connector in accordance with an embodiment of the invention with the wear indicator in contact with the mating member just prior to the connector being fully worn out.

Referring to the drawings wherein like reference characters are used for like parts throughout the several views, FIGS. 3–5 illustrate a cross section of the wedge thread of a pin member and a box member in accordance with embodiments of the invention. As shown in FIGS. 3–5, the addition of a wear indicator results in a conclusive method of determining connection wear.

As shown in FIG. 3, in one embodiment, a circumferential extension, wear indicator 18, of external shoulder 14 on pin member 10 is machined directly on the connection with a cross sectional geometry that will produce a visual indication of wear on both pin member 10 and box member 12 when wear indicator 18 comes into contact with a mating shoulder, i.e., external shoulder 16 on box member 12. Wear indicator 18 has cross sectional geometry that produces a bearing area that has no resistance to torque at the furthest plane from external shoulder 14 on pin member 10, however, as the plane of the wear indicator 18 gets nearer to external shoulder 14 on pin member 10, the bearing area of wear indicator 18 exponentially increases thus increasing the contact area with a mating box area as external shoulder 16 on box member 12 wears into the wear indicator 18. The connection is fully functional up to the point that the wear indicator 18 has worn flush to pin shoulder 14.

Figure 1:
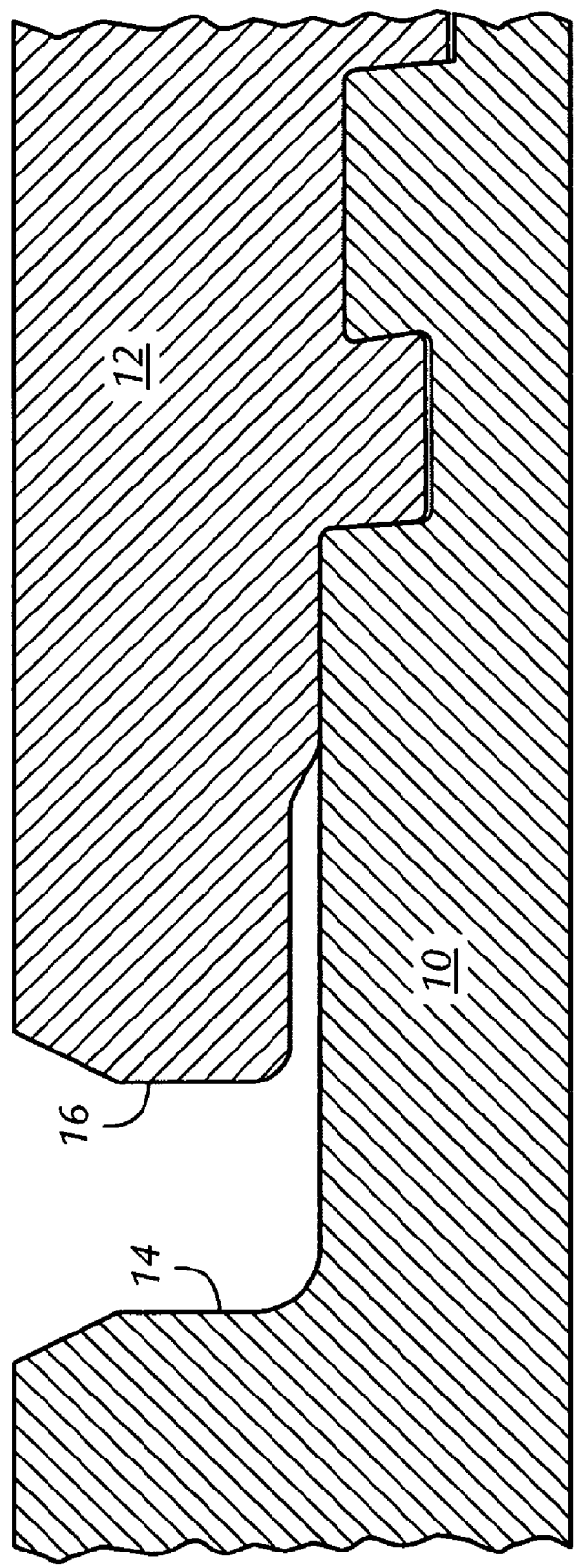
FIG. 1 is a side view of a prior art connector made up for the first time.
Figure 2:
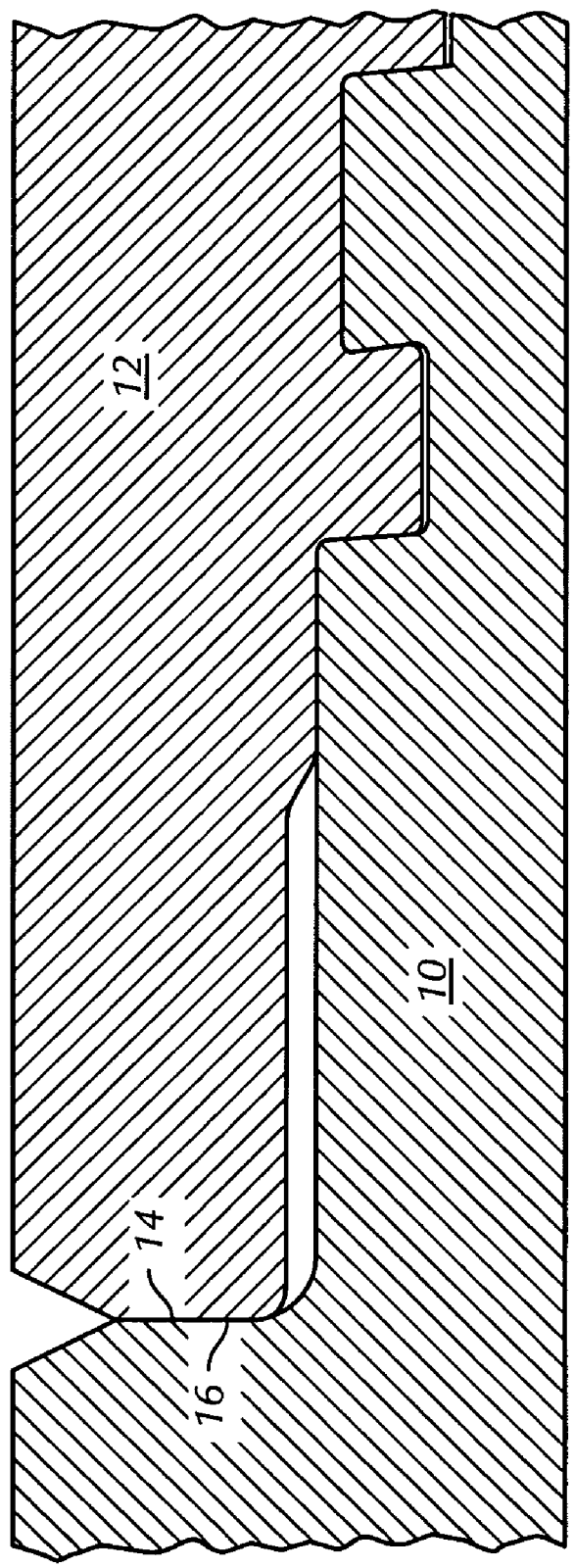
FIG. 2 is a side view of a prior art connector fully worn out.

Initially, in an embodiment of the invention, clearance, similar to that shown in FIG. 1, exists between the shoulders of the pin and box members when the connection is made-up for the first time. However, as shown in FIG. 3, clearance exists between not only external shoulder 14 of pin member 10 and external shoulder 16 of box member 12, but also between wear indicator 18 and external shoulder 16 of box member 12 when the connection is first made-up. FIG. 4 illustrates that contact exists between wear indicator 18 and external shoulder 16 of box member 12 prior to contact between external shoulder 14 of pin member and external shoulder 16 of box member 12. The contact with wear indicator 18 therefore occurs prior to the connection becoming fully worn out. This results in a visual indication of connection wear. Also, because the wear indicator is machined to have an exponentially increasing contact area, additional make-ups after initial contact of wear indicator 18 will magnify the visual indicator of worn out connections. In addition, since the wear indicator is effective under power tight make-up of the connection, distortion of thread form does not degrade the performance of the wear indicator.

As shown in FIG. 5, in one embodiment, wear indicator 18 is added to external shoulder 16 of box member 12. Similar to as earlier described, clearance will exist between tool joint 18 and its complementary shoulder, i.e., in this case, external shoulder 14 on pin member 10, when made-up for the first time. However, similar to the embodiment shown in FIG. 4, contact will occur between wear indicator 18 and external shoulder 14 of pin member 10 prior to the connection becoming fully worn out. The placement of wear indicator 18 on external shoulder 16 of box member 12 yields similar advantages to the earlier described embodiment.

Alternatively, the wear indicator may be added to either the internal shoulder of the pin member or the internal shoulder of the box member and achieve the advantages described above. Essentially, the mating of the internal shoulders of the pin and box members parallels that of the external shoulders. Further, the addition of a wear indicator is not limited in number. Multiple wear indicators may be added to the pin member, the box member, or both and may be added on the internal shoulders, external shoulders or elsewhere. The geometry of the wear indicator is also explained in exemplary form and it is understood by those skilled in the art that other geometries may be employed to achieve similar results.

This invention has many advantages over conventional joints. The function of the wear indicator is relative to power torque of the connection. The wear indicator is not influenced by a damaged or distorted thread form. The wear indications are clearly visible to the naked eye on both pin and box members. Given the ease of detection of wear and that the initial indications of extreme wear occur just prior to the end of the useful life of the connection, worn connections can be isolated in the field prior to any reduction in performance without extensive training or skill level requirements. The geometry of the wear indicator produces no resistance to torque at initial contact, however, if make-ups occur after initial contact, the wear indicator bearing area increases exponentially thus magnifying the obviousness of worn out connections.

Because many possible embodiments may be made of the invention without departing from the scope thereof, it is to be understood that all matter herein set forth or shown in the accompanying drawings is to be interpreted as illustrative and not in a limiting sense. While the present invention has been described with respect to a limited number of preferred embodiments, those skilled in the art will appreciate numerous modifications and variations therefrom. The appended claims are intended to cover all such modifications and variations which occur to one of ordinary skill in the art.

What is claimed is:

1. A threaded pipe connection comprising:
   a pin member having external threads increasing in width in one direction;
   a box member having internal threads increasing in width in an opposite direction so that the internal threads and the external threads move into engagement upon make-up of the connection; and
   a wear indicator that extends from at least one of the group consisting of a shoulder of the box member and a shoulder of the pin member.

2. The threaded pipe connection of claim 1 wherein the wear indicator is disposed on the pin member.

3. The threaded pipe connection of claim 1 wherein the wear indicator is disposed on the box member.

4. The threaded pipe connection of claim 1 wherein the shoulder of the pin member comprises an external shoulder of the pin member and the wear indicator is disposed on the external shoulder of the pin member.

5. The threaded pipe connection of claim 1 wherein the shoulder of the box member comprises an external shoulder of the box member and the wear indicator is disposed on the external shoulder of the box member.

6. The threaded pipe connection of claim 1 wherein the shoulder of the pin member comprises an internal shoulder of the pin member and the wear indicator is disposed on the internal shoulder of the pin member.

7. The threaded pipe connection of claim 1 wherein the shoulder of the box member comprises an internal shoulder of the box member and the wear indicator is disposed on the internal shoulder of the box member.

8. The threaded connection of claim 1 wherein:
the pin member has an external shoulder;
the box member has an external shoulder; and
the wear indicator extends from the external shoulder of the pin member and the external shoulder of the box member.

9. The threaded connection of claim 1 wherein:
the pin member has an internal shoulder;
the box member has an internal shoulder; and
the wear indicator extends from the internal shoulder of the pin member and the internal shoulder of the box member.

10. The threaded pipe connection of claim 1, wherein wear indicator comprises a circumferential extension.

11. The threaded pipe connection of claim 1, wherein the wear indicator does not contact the other of the group consisting of the shoulder of the box member and the shoulder of the pin member, when the connection is first connected.

12. A method of manufacturing a connection wear indicator, comprising:
providing a pin member having external threads increasing in width in one direction;
providing a box member having internal threads increasing in width in an opposite direction so that the internal threads and the external threads move into engagement upon make-up of the connection; and
providing a wear indicator for the connection that extends from at least one of the group consisting of a shoulder of the box member and a shoulder of the pin member.

13. The method of claim 12 further comprising:
disposing the wear indicator on the pin member.

14. The method of claim 12 further comprising:
disposing the wear indicator on the box member.

15. The method of claim 12 wherein the shoulder of the pin member comprises an external shoulder of the pin member, the method-further comprising:
disposing the wear indicator on the external shoulder of the pin member.

16. The method of claim 12 wherein the shoulder of the box member comprises an external shoulder of the box member, the method further comprising:
disposing the wear indicator on the external shoulder of the box member.

17. The method of claim 12 wherein the shoulder of the pin member comprises an internal shoulder of the pin member, the method further comprising:
disposing the wear indicator on the internal shoulder of the pin member.

18. The method of claim 12 wherein the shoulder of the box member comprises an internal shoulder of the box member, the method further comprising:
disposing the wear indicator on the internal shoulder of the box member.

19. The method of claim 12 wherein the shoulder of the box member comprises an external shoulder of the box member and the shoulder of the pin member comprises an external shoulder of the pin member, the method further comprising:
disposing the wear indicator on at least one of the external shoulder of the pin member and the external shoulder of the box member.

20. The method of claim 12 wherein the shoulder of the box member comprises an internal shoulder of the box member and the shoulder of the pin member comprises an internal shoulder of the pin member, the method further comprising:
disposing the wear indicator on at least one of the internal shoulder of the pin member and the internal shoulder of the box member.

21. A threaded pipe connection comprising:
a pin member having external threads increasing in one direction;
a box member having internal threads increasing in an opposite direction so that the internal threads and the external threads move into engagement upon make-up of the connection; and
means for indicating connection wear.

22. A threaded pipe connection comprising:
a pin member having external threads increasing in width in one direction;
a box member having internal threads increasing in width in an opposite direction so that the internal threads and the external threads move into engagement upon make-up of the connection; and
a wear indicator that extends from a shoulder of the connection, wherein connection wear is indicated by contact between the wear indicator and the other of the shoulder of the pin member and the shoulder of the box member.

23. The threaded pipe connection of claim 22, wherein the wear indicator extends from at least one of the group consisting of a shoulder of the box member and a shoulder of the pin member.

* * * * *